Patented Feb. 12, 1952

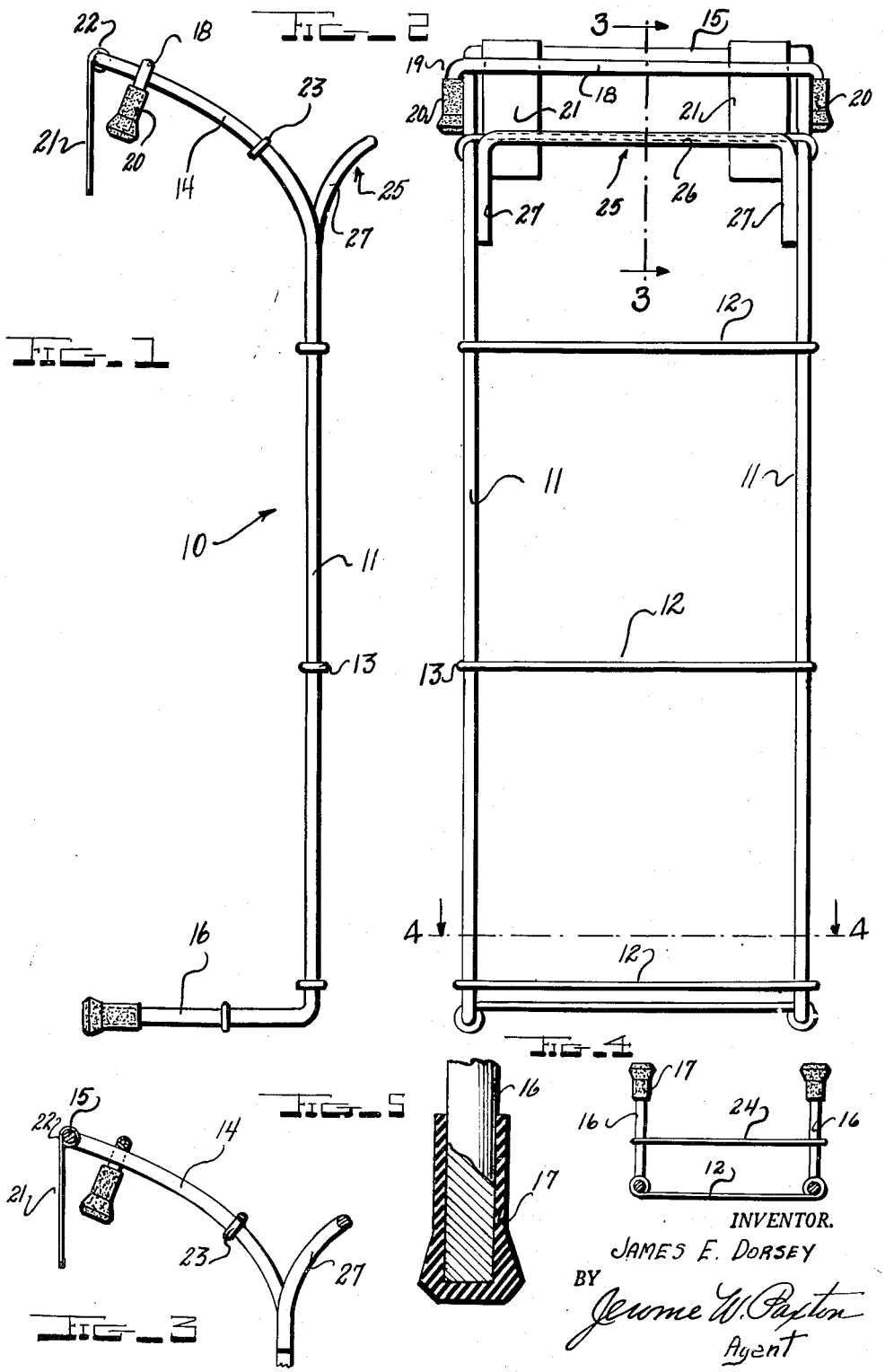

2,585,231

UNITED STATES PATENT OFFICE 2,585,231

ARTICLE HOLDER

James E. Dorsey, Las Vegas, Nev., assignor of ninety-five per cent to Maurice M. Gedance and five per cent to Joe Huffard, both of Las Vegas, Nev.

Application December 12, 1947, Serial No. 791,348

4 Claims. (Cl. 224—29)

The present invention relates to article holders, and more particularly is directed to an article holder which is adapted to be removably secured to the door or window of an automobile for supporting water bags and the like. While I have described my invention as being supported by an automobile, it is to be understood that it may be used in conjunction with other types of mobile vehicles and may furthermore be employed for supporting articles other than water bags.

Heretofore, it has been necessary for persons residing in deserts and other arid localities when traveling by automobile to secure the water bags to various parts of the automobile, such as the bumper, door handles, and the radiator grill. This, of course, is not desirable, in that the automobile accessories or paint finish may be damaged and, in addition, it detracts from the external appearance of the vehicle. While I am aware that article carriers for use with vehicles have been provided, these prior carriers have not been entirely satisfactory, are either relatively complex in structural details or else they are so fabricated as to possibly injure the finish of the automobile.

Accordingly, an important object of my invention is to provide a carrier for water bags and the like which will not be open to the foregoing and other objectionable features.

A further object of my invention is to provide an article carrier or bracket for supporting water bags which may be readily secured to or removed from the sill of the automobile window which is so designed that it will not mar the finish of the automobile.

Yet a further object of my invention is to provide a carrier or bracket of the type set forth which is simple in structural details, efficient in operation, and capable of being readily and inexpensively manufactured.

Yet a further object of the present invention is to provide a rigid frame or article carrier having resilient cushions or buffers located at those portions of the frame which contact the body of the automobile for preventing injury to the automobile finish and slippage of the frame or article holder.

To accomplish the above and other advantageous objects, the inventive concept in its broadest aspect comprises a rigid frame element provided adjacent its upper end, with means for detachably securing the frame to the window of the automobile. Both the upper and the lower end of the frame carry resilient buffers which contact the sill and body of the vehicle for supporting the frame above the bottom sill of the window and at the same time preventing slippage of the frame and injury to the finish of the automobile. A holding member for supporting the water bag is provided in proximity to the upper end of the frame, and the frame when attached to the automobile body is so disposed as to permit the water bag to be cooled by air flow during movement of the automobile.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation of the frame or bracket constructed in accordance with my invention.

Figure 2 is a front view of the device shown in Figure 1.

Figure 3 is a sectional view taken along the line 3—3 of Figure 2, looking in the direction of the arrows.

Figure 4 is a sectional view taken along the line 4—4 of Figure 2, looking in the direction of the arrows, but being on a somewhat smaller scale.

Figure 5 is a detail vertical sectional view showing the manner in which the resilient buffer or cushion is positioned on the frame.

Referring to the drawings, and more especially to Figures 1 and 2, I have designated the frame generally by the numeral 10 and it includes a pair of parallel vertically extending rods 11 which are maintained in the desired spaced relationship by a plurality of laterally extending braces 12. While I prefer that the ends of the braces 12 are looped around the rods 11, as shown at 13, this connection can be made in any other desirable or convenient manner. The upper ends of the rods 11 are curved, as depicted at 14, and are connected by a cross rod 15 formed integrally with the rods 11 or, if so desired, the rod 15 may be a single piece which is brazed or otherwise secured to the upper ends of the curved portion 14. The lower ends of the rods 11 terminate in an extension 16 which is disposed at right angles to the rod 11. Each of the extensions 16 carries a cushion or buffer 17 formed from any suitable resilient material such as rubber, and the buffer 17 is frictionally held on the extension.

Adjacent the cross rod 15 and spaced downwardly therefrom in parallel relation is a second cross rod 18 terminating at each end in a downwardly extending member 19. The cross rod 18 may be fixedly secured to the curved portion 14 of each of the rods 11 by welding or the like. A cushion or buffer 20 similar to the buffer 17 is secured to the member 19. An anchoring plate or member such as a sheet metal extension 21 is rolled around the cross rod 15 at its upper end, as shown at 22, and in the preferred form of my invention, it will be noted that I provide an extension 21 adjacent each of the vertical rods 11. The extension 21 is adapted to fit in the channel in which the automobile window moves and the buffer 20 will contact the bottom sill of the window to space the vertical support from the window sill portion of the interior of the vehicle body. The buffers 17 will, of course, contact the door or body of the automobile, thus preventing injury to the finish thereof and at the same time overcoming any danger of the frame 10 slipping with respect to its position on the automobile body.

I have found it desirable, though not essential, to provide a cross brace 23 connecting the parallel bars 11 in the curved portion 14, and a similar brace 24 is secured to the extension 16. The braces 23 and 24 are similar in construction to the cross braces 12 and no further description is thought necessary. A holding arm, indicated generally 25, for supporting the water bag comprises a laterally extending portion 26 provided at each end with an extension 27. Each extension 27 is brazed or welded to the rods 11 and, as best shown in Figures 2 and 3, the extensions curve outwardly with respect to the rods. The cords or ropes which are attached to the water bag are held by the member 25, thereby maintaining the bag in a substantially upright position.

It will be readily appreciated from the above that I have provided a very simple framework which can be readily secured to and detached from the automobile door for holding a water bag or like product firmly in a position to be cooled by the flow of air around the vehicle body during travel. Moreover, the framework is provided with resilient buffers or the like at those points of the frame which contact the finish of the body and thus prevent marring of the surface and also serving to overcome any slipping of the frame. The frame is so constructed as to possess considerable strength and thereby support articles of considerable weight. Due to the simple constructional details of the framework, it may be easily and cheaply fabricated.

I claim:

1. A holder for water bags or the like adapted to be supported by the door or window frame of an automobile comprising a pair of parallel vertical supports, braces maintaining said supports in spaced apart relationship, an offset portion at the upper end of each of said vertical supports, means connecting the upper ends of said supports, and anchoring device carried by said connecting means for fitting within the window, a cross member secured to said offset portions in spaced relation to said connecting means, buffer means carried by said cross member for engaging the window frame thereby maintaining the offset portions above said window frame, additional buffer means carried by the lower end of each of said vertical supports for engaging the door of the automobile and a laterally extending arm secured to the vertical supports adjacent the offset portions thereof to which the water bag is attached whereby the bag will rest against the vertical supports.

2. In an article carrier of the type adapted to be supported by the door or window frame of an automobile, a frame, an anchoring plate carried by the upper end of the frame for fitting within the window, resilient buffer means on said frame adjacent said anchoring means for engaging the window frame thereby maintaining the anchoring means above the frame, additional resilient buffer means supported on the lower end of the frame for engaging the door, and a cross member attached to and extending forwardly of said frame a short distance adjacent the upper end thereof to which the article is secured for detachably supporting the article in close relationship to the frame.

3. A holder for water bags adapted to be supported by the door or window frame of an automobile comprising a pair of parallel vertical supports, lateral braces secured to and maintaining said supports in spaced apart relationship, a curved portion at the upper end of each of said vertical supports, a cross-piece connecting the upper ends of each of said vertical supports, at least one anchoring member carried by said cross-piece for fitting within the window, resilient buffer means supported by said curved portion of said vertical supports for contacting the window frame and maintaining said curved portions thereabove, an extension carried by the lower end of each of said vertical supports at right angles to said supports, a resilient buffer attached to the free end of each of said extensions for engaging the door of the automobile, a supporting arm extending a short distance forwardly from each of said vertical supports adjacent the upper end thereof and a cross member attached to said supporting arms whereby the water bag may be held in close relationship to said vertical supports.

4. A holder for water bags adapted to be supported by the door or window frame of an automobile comprising a pair of parallel vertical supports, lateral braces secured to and maintaining said supports in spaced apart relationship, a curved portion at the upper end of each of said vertical supports, a cross-piece connecting the upper ends of each of said vertical supports, at least one anchoring member carried by said cross-piece for fitting within the window, a cross member secured to said curved portions, resilient buffer means supported by said cross member for contacting the window frame and maintaining said vertical supports thereabove, an extension carried by the lower end of each of said curved portions at right angles to said supports, a resilient buffer attached to the free end of each of said extensions for engaging the door of the automobile, and a laterally extending supporting arm between said vertical supports adjacent the curved portions of the vertical supports to which the water bag is attached.

JAMES E. DORSEY.

REFERENCES CITED

The following references are of record in the file of this patent:

UNITED STATES PATENTS

| Number | Name | Date |
|---|---|---|
| 1,280,362 | Alveson et al. | Oct. 1, 1918 |
| 1,383,324 | Martell | July 5, 1921 |
| 1,778,771 | Pritchard | Oct. 21, 1930 |